May 1, 1951        D. GREENFIELD        2,550,805

ADJUSTABLE ILLUMINATED TELLURIAN

Filed May 13, 1949

INVENTOR.
DAVID GREENFIELD,
BY
ATTORNEY.

Patented May 1, 1951

2,550,805

UNITED STATES PATENT OFFICE 2,550,805

ADJUSTABLE ILLUMINATED TELLURIAN

David Greenfield, Los Angeles, Calif.

Application May 13, 1949, Serial No. 92,984

8 Claims. (Cl. 35—45)

This invention relates generally to an instructional apparatus for illustrating the incidence of solar light on the earth and relates more particularly to a device wherein a source of light simulating the sun may be accurately positioned with respect to the axis and equator of a rotatable globe representing the earth.

Prior devices have sought to illustrate the relation between the sun and the earth, the succession of the seasons, the time relationship between various points on the earth and similar phenomena. Such devices have in general been complex in structure and mechanism, and consequently too expensive for domestic use.

My invention, on the other hand, is simple and reliable in design and at the same time is well adapted for visual demonstration of solar phenomena. Its economy of manufacture and ease of adjustment commend it for use in the home, where children may early learn fundamental astronomical principles.

It is an object of this invention to disclose a novel and simple mechanism for demonstrating the effects of the sun's radiation on the earth.

Another object is to disclose a device by which the mean solar time at any point on the earth may be quickly and conveniently determined.

A further object of my invention is to disclose an apparatus which continuously shows which portions of the earth are experiencing sunrise, noon and sunset.

A still further object is to disclose an apparatus illustrating the causes of seasonal variations in length of day, average temperature and other phenomena manifesting cyclical changes.

These and other objects and purposes will become clear from a reading of the following description taken in connection with the accompanying drawing in which.

Figure 1:
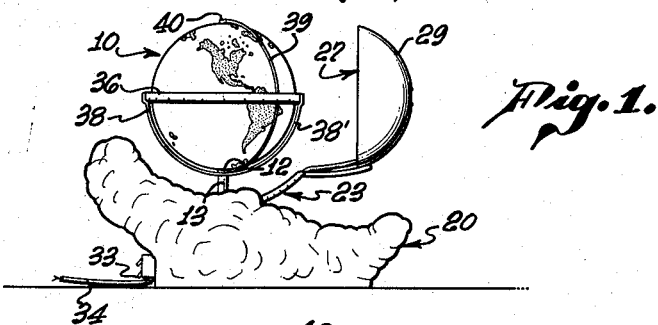
Fig. 1 is an elevational view of my invention.

Generally speaking, my invention includes a globe arranged for rotation about a vertical axis through its poles, an external source of light arranged to illuminate the globe and means for positioning the light source at any point in an arc concentric with the globe, simulating the sun's position at any point in its travel from the Tropic of Cancer to the Tropic of Capricorn.

Referring in detail to the drawings, globe 10 is supported by shaft 11 which is preferably disposed vertically. Shaft 11 is journaled at 12 to hollow sleeve member 13 and may be driven by electric motor 14 through a gear train indicated generally at 15 and including final drive shaft 16. Motor 14 is supplied with electric power by leads 32 connected through switch 33 and leads 34 to an external source of power not shown.

Shaft 11 is connected to final drive shaft 16 by frictional connection 17. Globe 10 will thus be normally rotated by the action of electric motor 14 through gear train 15 and final drive shaft 16, but globe 10 may be rotated by hand when desired. Hollow sleeve member 13 is fixed to base 20, as by threaded connection 21.

Figure 4:
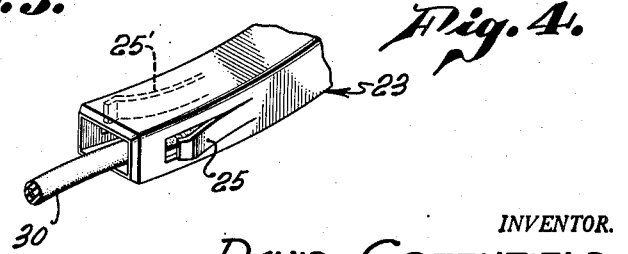
Fig. 4 is a perspective view of the lower end of the arcuate arm of my invention.

Formed in base 20 is arcuate slot 22 and slidably engaged within said slot is hollow arcuate arm 23 which is provided at its lower end with means for frictionally contacting the inner walls of slot 22. Said means, as seen in Fig. 4, preferably include projecting fingers 25 and 25' which springingly engage the inner vertical walls of slot 22, thus retaining arcuate arm 23 in any selected position in slot 22.

On the outer end of arm 23 is a light source indicated generally by 27 and including conventional electric lamp 28 and reflector 29. The shape of reflector 29 is preferably paraboloidal as shown, lamp 28 being disposed at the focus of reflector 29 so that substantially collimated light falls on globe 10. Lamp 28 is supplied with electric power through electric cord 30 and switch 31, said electric cord being contained within arcuate arm 23. The outside diameter of reflector 29 is preferably made substantially equal to the diameter of globe 10.

Figure 2:
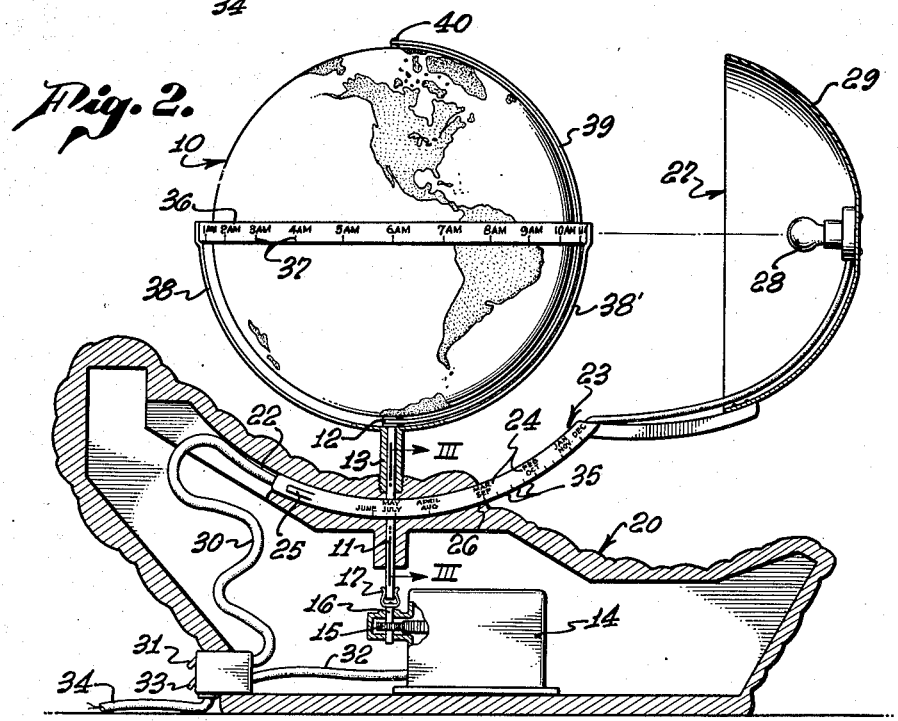
Fig. 2 is a detailed elevational view of my invention partially in section.
Figure 3:
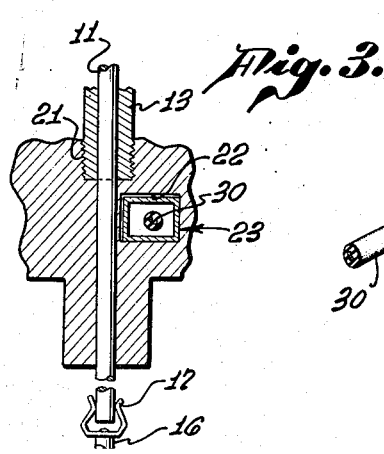
Fig. 3 is a sectional view taken on line III—III of Fig. 2.

Arcuate arm 23 contains on its outer surface a series of designations of calendar months 24 and a small mark corresponding to the 21st day of each month or pair of months. The marks are intended to be read by reference to edge 26 of base 20 where arcuate arm 23 emerges from arcuate slot 22. Thus light source 27, simulating the sun, may assume any position corresponding to the sun's travel from the Tropic of Cancer to the Tropic of Capricorn, and the proper position of light source 27 for any desired date in the year will be determined by calibrated markings 24 of arcuate arm 23. It is evident that the position of light source 27 illustrated in Fig. 2 corresponds to the vernal or autumnal equinox and to the calendar dates of March 21 or September 21. The center of light source 27 moves in a vertical arc coplanar with the axis of globe 10.

I may further divide the arc on arm 23 by providing additional markings 35 between the main monthly scale divisions substantially corresponding to weekly time intervals between the major monthly scale indicia. The user is thereby enabled more conveniently and accurately to adjust arcuate arm 23 to the date desired to be illustrated.

I may also provided equatorial time band 36, preferably constructed of a transparent material and marked as at 37 with hours of the day uniformly arranged around the circumference of globe 10. Noon will, of course, be indicated on time band 36 on the side of globe 10 closest to light source 27. Time band 36 is supported by arcuate support members 38 and 38' preferably made of transparent material, said arcuate members 38 and 38' being fixed at their lower ends to hollow sleeve member 13. It is understood that time band 36 remains stationary at all times.

I may also provide movable meridian 39 pivotally mounted at north pole 40 and at journal 12 at the south pole.

In the normal operation of my invention, motor 14 is connected to an external source of electric power through leads 32 and 34 and switch 33, as above described. Globe 10 may then be manually adjusted so that the mean solar time of any place on earth, as indicated by equatorial time band 36, corresponds to the actual position of the earth and said globe will then be continuously driven so that the surface of globe 10 closest to light source 27 always represents that portion of the earth where it is noon by mean solar time.

When electric lamp 28 is then energized, a true and vivid illustration is provided of solar phenomena. Thus the portions of the earth where the sun is just rising or just setting may be immediately seen. If it is desired to determine the mean solar time of any point on the earth, it is only necessary to set movable meridian 27 over the desired point and read the time indicated on time band 36 at the intersection of time band 36 and meridian 39.

The phenomenon of seasonal variations in the length of daylight hours is likewise conveniently illustrated. Light source 27 may be manually moved to any position in a vertical arc extending 23½° above and below the equatorial plane of globe 10. For example, when light source 27 is adjusted to its northernmost position so that calibrated marking 24 corresponding to the month of June is opposite edge 26 of base 20, the illumination of globe 10 illustrates the summer solstice and the cause of the longer days and warmer temperatures obtaining in the northern hemisphere at that time of year can be readily understood.

Thus it will be seen that I have provided an inexpensive and easily adjusted device for illustrating periodic solar changes. Motor 14 may be the driving unit of a conventional electric clock geared down in a 1 to 2 ratio by gear train 15. Electric lamp 28 may, of course, be readily replaced when burned out and may be of a comparatively small wattage so that it may be left illuminated at all times. Under these latter conditions especially, my invention is an ornamental adjunct to the furnishings of a home as well as being a useful and instructional apparatus.

It is understood that the foregoing description and accompanying drawing are illustrative only, and that the scope of my invention is to be interpreted solely in the light of the appended claims.

I claim:

1. An instructional apparatus comprising: a base including an arcuate slot; a vertical shaft rotatably mounted in said base; a terrestrial globe carried by said shaft and having north and south poles and an equator, said shaft being colinear with a line joining said poles; a yoke fixed to said base including two oppositely disposed symmetrical arcuate support members exending upwardly to the equatorial plane of said globe; a narrow equatorial time belt encircling said globe and spaced therefrom carried by said arcuate support members, said belt bearing thereon an hourly-spaced mean solar time scale; a movable meridian pivotally attached to north and south poles of said globe and rotatable in a sphere having a radius greater than that of said globe; an arcuate arm slidably engaged within said arcuate slot and extending outwardly thereof, said slot and arm being concentric with said globe and said arm bearing thereon a scale calibrated from summer to winter solstices; a light source mounted on the outer end of said arm and arranged to illuminate said globe, said light source having a diameter substantially equal to the diameter of the globe; means for retaining said arm at selected positions within said slot whereby the center of said light source may be placed and maintained at any desired point in an arc concentric with said globe and coplanar therewith, said arc extending 23½° above and below the equatorial plane of said globe; and means for imparting diurnal rotation to said shaft and globe, said means including a source of rotational power and a frictional connection whereby said globe may be manually rotated at will.

2. An instructional apparatus of the character stated in claim 1 wherein said light source includes a reflector adapted to illuminate said globe with substantially collimated light.

3. In an instructional apparatus for illustrating the incidence of solar light on the earth, the combination of: a base provided with a terrestrial globe having poles and an equator, said globe being rotatable relative to said base about a stationary vertical axis; a source of light external to the globe having a diameter substantially equal to the diameter of said globe; and adjustable supporting means extending from the base for selectively positioning the center of said light source in an arc concentric with said globe, said arc being coplanar with the axis of rotation of said globe and extending 23½° above and below the equatorial plane of said globe.

4. An instructional apparatus in accordance with claim 3, wherein said supporting means is provided with indicia of calendar dates correlated to the angular position of the center of said light source with respect to the equatorial plane of said globe.

5. An instructional apparatus in accordance with claim 3, including a drive means within the base and a frictional driving connection between the drive means and the globe.

6. In an instructional apparatus for illustrating the incidence of solar light on the earth, the combination of: a base provided with a terrestrial globe having poles and an equator and arranged for rotation about a stationary vertical axis through said poles; an electric motor for imparting diurnal rotation to said globe; a source of substantially collimated light external to the globe having a diameter substantially equal to the diameter of said globe; and means for selectively positioning the center of said light source in an arc concentric with said globe, said arc being coplanar with said axis and extending 23½° above and below the equatorial plane of said globe.

7. An instructional apparatus in accordance with claim 6, including two symmetrically disposed arcuate support members fixed to said base and a narrow, stationary, circular equatorial time band carried by said arcuate support members encircling said globe and uniformly spaced therefrom.

8. An instructional apparatus in accordance with claim 7, including a movable meridian pivotally attached to said poles and having a radius greater than that of said globe.

DAVID GREENFIELD.

REFERENCES CITED

The following references are of record in the file of this patent:

UNITED STATES PATENTS

| Number | Name | Date |
| --- | --- | --- |
| 202,590 | Schedler | Apr. 16, 1878 |
| 2,059,031 | Replogle | Oct. 27, 1936 |
| 2,287,594 | Barbagelata | Mar. 25, 1941 |

FOREIGN PATENTS

| Number | Country | Date |
| --- | --- | --- |
| 425,108 | Great Britain | Mar. 4, 1935 |